United States Patent [19]

Nitschke

[11] 4,386,952

[45] Jun. 7, 1983

[54] GLASS SHEET BENDING SYSTEM UTILIZING GAS JETS

[76] Inventor: David B. Nitschke, 9102 Buck Rd., Perrysburg, Ohio 43551

[21] Appl. No.: 364,104

[22] Filed: Mar. 31, 1982

[51] Int. Cl.³ ............................................ C03B 23/023
[52] U.S. Cl. ...................................... 65/268; 65/104; 65/106; 65/273; 65/287
[58] Field of Search .................. 65/104, 268, 273, 287, 65/106

[56] References Cited

U.S. PATENT DOCUMENTS

| | | | |
|---|---|---|---|
| 3,676,098 | 7/1972 | Hall | 65/106 |
| 3,778,244 | 12/1973 | Nedelec et al. | |
| 4,202,681 | 9/1980 | McMaster et al. | |
| 4,204,854 | 5/1980 | McMaster et al. | |
| 4,222,763 | 5/1980 | McMaster | |
| 4,282,026 | 8/1981 | McMaster et al. | |
| 4,356,018 | 10/1982 | McMaster | 65/104 |

Primary Examiner—Arthur D. Kellogg
Attorney, Agent, or Firm—Reising, Ethington, Barnard, Perry, Brooks & Milton

[57] ABSTRACT

A glass sheet bending system (10) is disclosed as including a compressed gas bending unit (28) located above a horizontal conveyor (22) on which glass sheets are heated within a furnace (12) of the system. A downwardly facing curved surface (26) of a holder (24) above conveyor (22) receives a heated glass sheet from the conveyor for bending. Compressed gas fed through outlets (34) of the bending unit (28) provides inclined gas jets directed in a generally perpendicular relationship to the holder surface (26) with a sufficient intensity to bend the glass sheet on the holder (24) to the curved shape of its surface. The conveyor (22) of the system is preferably of the roller type including spaced rolls (36) and the bending unit (28) is disclosed as including a pair of supply conduits (48) extending upwardly between the rolls to supply compressed gas to a pair of delivery conduits (52) which define the outlets (34). A blow-up unit (60), a vacuum drawing unit (64) for the holder, and a vertically operable actuator (66) for the holder preferably cooperate with the bending unit (28). A curved mold (30) is moved to below the holder (24) to receive the bent glass sheet and further bending of the glass sheet preferably takes place on the mold under the operation of gravity. The system also includes a quench unit (16) to which the mold (30) moves the bent glass sheet for tempering in order to improve its mechanical properties.

15 Claims, 5 Drawing Figures

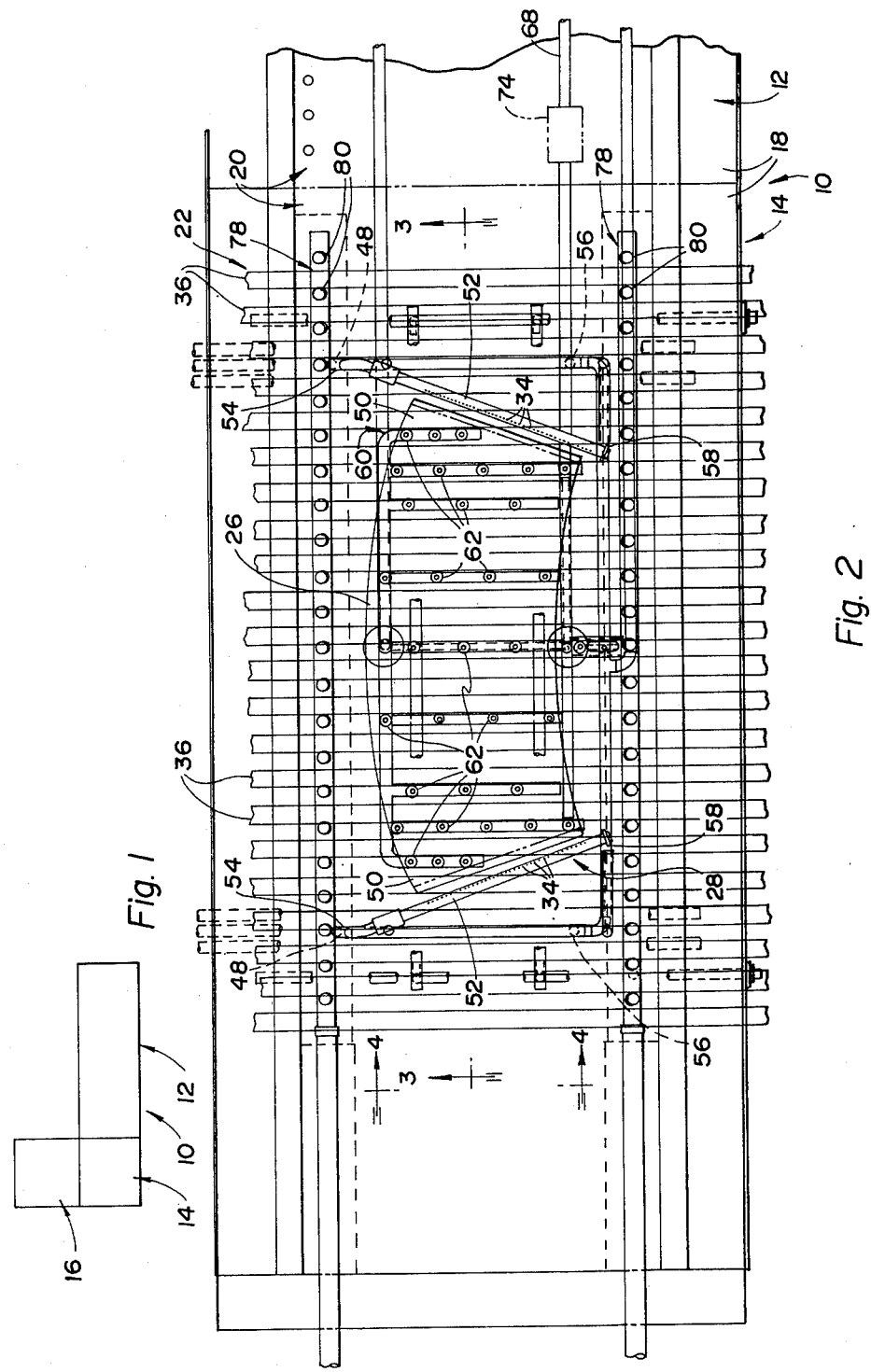

GLASS SHEET BENDING SYSTEM UTILIZING GAS JETS

TECHNICAL FIELD

This invention relates to bending of glass sheets and has particular utility when utilized to bend glass sheets to a relatively abrupt curvature.

BACKGROUND ART

The prior art discloses many types of systems for bending and/or tempering heated glass sheets such as is necessary, for example, with vehicle windows. One type of bending system includes a holder having a downwardly facing surface of a downwardly convex curved shape for receiving a heated glass sheet from a conveyor below the holder. After bending against the holder, a mold of the system receives the heated glass sheet for cooling.

U.S. Pat. No. 3,778,244 discloses a glass sheet bending system of the type described above whose holder is surrounded by a hood through which an aspirator draws gas in order to provide bending of a heated glass sheet against the holder surface. After such bending, the glass sheet is received by a mold which is then moved to a cooling chamber where annealing of the bent glass sheet takes place.

U.S. Pat. No. 4,282,026 discloses a glass bending and tempering system having one embodiment including a holder with a curved surface against which auxiliary lifters engage and bend a heated glass sheet received from a conveyor below the holder. After such bending, an open center mold having a greater curvature than the holder surface receives the heated glass sheet for additional bending under the operation of gravity. An actuator moves the mold from the holder to an adjacent quench unit with the bent glass sheet thereon in a time to control the extent of bending before tempering of the glass sheet at the quench unit.

U.S. Pat. No. 4,204,854 discloses a glass sheet bending system including a plurality of gas jet pumps that receive a primary inflow of gas and produce an amplified secondary outflow of gas upwardly from below a conveyor against a heated glass sheet on the conveyor below a holder of the system. Certain of the embodiments disclosed have a holder of a downwardly convex curved shape such that the upward gas flow bends the heated glass sheet against the curved holder.

U.S. Pat. Nos. 4,202,681 and 4,222,763 disclose glass sheet bending systems including gas jet pumps utilized to draw a vacuum through the surface of a holder that receives a heated glass sheet from a conveyor for bending.

DISCLOSURE OF INVENTION

An object of the present invention is to provide an improved system for bending heated glass sheets. In carrying out this object, the system disclosed has particular utility when utilized to form relatively deep or abrupt bends in glass sheets such as, for example, end bends having a radius of curvature less than ⅓ of the radius of curvature of the central portion between the end bends.

The glass sheet bending system in which the invention is incorporated includes a furnace for heating glass sheets to a sufficiently high temperature for bending and a horizontal conveyor for conveying glass sheets in a generally horizontally extending orientation within the furnace for heating. A holder of the system has a downwardly facing surface of a downwardly convex curved shape for receiving a heated glass sheet from the conveyor. A mold receives the heated glass sheet from the holder after bending thereof has been performed by a compressed gas bending unit constructed in accordance with the invention. The compressed gas bending unit is located above the conveyor in proximity to the holder spaced horizontally outward from the periphery of the holder surface. The bending unit includes outlets through which compressed gas is fed to provide inclined gas jets directed toward the holder surface in a generally perpendicular relationship thereto and with a sufficient intensity to bend the heated glass sheet on the holder to the curved shape of its downwardly facing surface.

In the preferred construction of the system, the conveyor utilized is of the roller type including spaced rolls on which the glass sheets are conveyed through the furnace to below the holder. Adjacent the holder, the bending unit includes at least one supply conduit extending upwardly between the conveyor rolls to supply the compressed gas to the outlets in order to provide the inclined gas jets for performing the bending. In addition to the supply conduit, the bending unit also preferably has a delivery conduit which includes the outlets through which the compressed gas is fed. The delivery conduit has a connection to the supply conduit in order to be supported thereby and to receive compressed gas therefrom for delivery through the outlets. As disclosed, the delivery conduit has an elongated shape including opposite ends with the connection to the supply conduit being at one end of the delivery conduit. A support extends upwardly between the conveyor rolls and has a connection to the other end of the delivery conduit to cooperate with the supply conduit in supporting the delivery conduit.

In the preferred system disclosed, the bending unit includes a pair of the supply conduits and also includes a pair of the delivery conduits respectively associated with the pair of supply conduits. The supply conduits project upwardly between the conveyor rolls respectively adjacent opposite extremities of the holder surface. Each delivery conduit includes a plurality of the outlets through which the compressed gas is fed. A pair of connections respectively connect the pair of supply conduits and the pair of delivery conduits. Both of the delivery conduits have elongated constructions including opposite ends, with one end being supported by the connection thereof to the associated supply conduit, and with the other end thereof having a connection to the associated support which extends upwardly between the conveyor rolls.

In the preferred construction of the system disclosed, the holder and the compressed gas bending unit are located within the heating chamber such that the glass temperature does not decrease prior to the bending as would be the case with the holder located outside of the heating chamber. The spaced rolls of the roller conveyor convey each glass sheet to below the holder within the heating chamber in preparation for the bending. A plurality of gas jet pumps of the system blow gas upwardly between the rolls of the conveyor toward a heated glass sheet upon conveyance below the holder to provide an upward lifting force toward the holder surface. In addition, the preferred embodiment of the system also includes a vacuum drawing unit for drawing a vacuum at the holder surface to support the heated glass sheet received from the conveyor. An actuator is also provided to move the holder vertically. Initially, the actuator moves the holder downwardly to a lower position into proximity with the conveyor to receive the heated glass sheet from the conveyor. Such positioning facilitates the initial support of the heated glass sheet against the holder surface by the vacuum drawn at the surface and/or by the gas jet pumps that blow gas upwardly between the conveyor rolls. Thereafter, the actuator moves the holder upwardly to a raised position in a spaced relationship above the conveyor to allow the mold to move under the holder to receive the glass sheet upon termination of the vacuum.

As disclosed, the outlets of the bending system comprise simple jet openings through which the compressed gas is fed to provide the gas jets. Heated gas within the heating chamber is drawn by the gas jets to provide a gas flow that performs the bending in cooperation with the vacuum which is drawn at the holder surface. A heater is also preferably provided for heating the compressed gas prior to being fed through the outlets such that the gas jets do not cool the glass sheet during the bending.

The glass sheet bending system also preferably includes a quench unit to which the mold moves the bent glass sheet to provide tempering. During operation in the preferred construction, the mold is moved back and forth on a shuttle between the quench station and the heating chamber in which the holder is located. The mold also preferably has at least a substantial portion with a greater curvature than the holder surface such that the glass sheet bends further on the mold under the impetus of gravity after the initial bending thereof on the holder by the compressed gas bending unit.

The objects, features, and advantages of the present invention are readily apparent from the following detailed description of the best mode for carrying out the invention when taken in connection with the accompanying drawings.

BRIEF DESCRIPTION OF DRAWINGS

FIG. 1 is a top plan schematic view of a glass sheet bending and tempering system that is constructed in accordance with the present invention;

FIG. 2 is a top plan view taken in the same direction as FIG. 1 to illustrate a bending station of the system;

BEST MODE FOR CARRYING OUT THE INVENTION

Referring to FIG. 1 of the drawings, a glass sheet bending and tempering system generally indicated by 10 includes a furnace 12 having a bending station 14 that is constructed in accordance with the present invention to bend glass sheets heated within the furnace. System 10 also includes a quench station 16 to which each bent glass sheet is moved from the bending station 14. Opposed blastheads of the quench station 16 supply cooling gas to the bent glass sheet in order to provide tempering that improves the mechanical properties of the glass.

Figure 3:
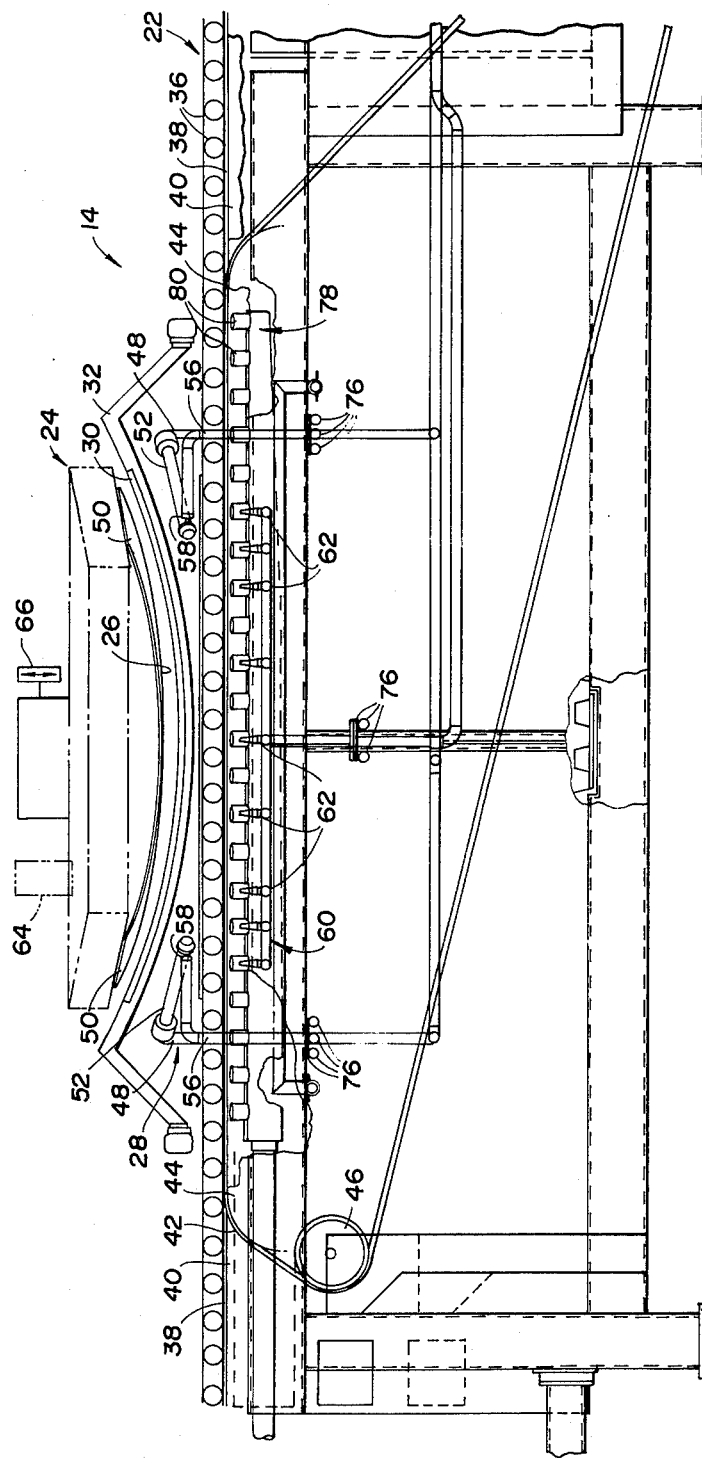
FIG. 3 is an elevation view of the bending station of the system taken along the direction of line 3—3 in FIG. 2.

With reference to FIG. 2, the furnace 12 includes an insulated housing 18 that defines a heating chamber 20. A horizontal conveyor generally indicated by reference numeral 22 conveys glass sheets in a horizontally extending orientation within the furnace 12 for heating from room temperature to the bending temperature. As seen in FIG. 3, a holder 24 of the bending station 14 is positioned above the conveyor 22 and has a downwadly facing surface 26 of a downwardly convex curved shape for receiving a heated glass sheet G from the conveyor. A compressed gas bending unit 28 constructed in accordance with the present invention is then operated as is more fully hereinafter described to bend the heated glass sheet to the shape of the holder surface 26. Thereafter, a mold 30 mounted on a shuttle 32 receives the bent glass sheet from the holder and subsequent shuttle movement transfers the mold and the glass sheet to the quench unit for tempering. It will be noted that substantially the entire extent of the mold 30 has a greater curvature than the holder surface 26 such that the glass sheet bends further on the mold under the operation of gravity after the initial gas jet bending against the holder surface.

Figure 5:
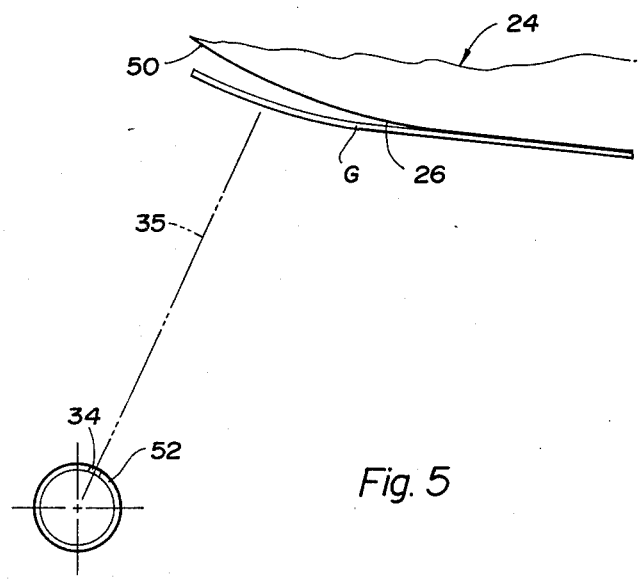
FIG. 5 is a view which illustrates the manner in which inclined gas jets are utilized to perform bending at the bending station.

The compressed gas bending unit 28 is located above the conveyor 22 as illustrated in FIG. 3 and, as seen in FIG. 2, is spaced horizontally outward from the periphery of the holder surface 26 such that the heated glass sheet to be bent can be received thereby from the conveyor. As illustrated in FIG. 2, the bending unit 28 includes outlets 34 through which compressed gas is fed as shown in FIG. 5 to provide inclined gas jets 35 directed toward the holder surface 26 in a generally perpendicular relationship to the surface. The gas pressure and the size of the outlets 34 are selected such that the gas jets 35 have a sufficient intensity to bend the heated glass sheet on the holder to the shape of its downwardly facing curved surface 26.

As illustrated in FIGS. 2 and 3, the conveyor 22 of the system is preferably of the roller type including elongated rolls 36 that are spaced along the direction of conveyance. Each conveyor roll 36 has opposite ends including unshown end pins which are received by fixed locators so as to permit rotation thereof while preventing movement of the rolls along the direction of conveyance. With reference to FIG. 3, the conveyor rolls 36 upstream from the bending station 14 and downstream from the bending unit 28 are supported on and frictionally driven by a pair of continuous drive loops 38 (only one of which is shown) generally in the manner taught by U.S. Pat. Nos. 3,806,312, 3,934,970, 3,947,242, and 3,994,711. Each drive loop 38 is received by a pair of sheaves adjacent opposite ends of the system and has a driving reach that is slidably movable over an associated horizontal support surface 40 adjacent one lateral side of the system. Movement of the driving reach of drive loop 38 toward the right as viewed in FIG. 3 rotates the conveyor rolls 36 counterclockwise to convey glass sheets from the right toward the left.

Adjacent the bending station 14 as shown in FIG. 3, the conveyor rolls 36 are supported on and frictionally driven by another pair of continuous drive loops 42 (only one of which is shown) to permit a glass sheet at the bending station to be conveyed independently of glass sheets being heated within the furnace. Each drive loop 42 has a driving reach that is slidably driven over an associated support surface 44 at one lateral side of the conveyor. Conveyor rolls 36 at the bending station 14 have unshown end pins that are received by fixed locators so as to permit rotation thereof while preventing movement of the rolls along the direction of conveyance during the rotational driving by the drive loops 42. From the support surface 44, the drive loop 42 extends downwardly to an idler sheave 46 at one end of the bending station and extends downwardly adjacent the other end thereof to a suitable drive mechanism which is not shown.

The construction of the conveyor 22 described above permits each glass sheet adjacent the bending station 14 to be slowed down upon being received by the holder 24 in order to insure accurate location thereof on the holder surface 26. As the one glass sheet is being slowed down to be received by the holder 24, the other glass sheets being heated in the furnace can be conveyed without any change in their rate of movement. Also, the slowdown of the conveyance adjacent the bending station 14 reduces sliding between the glass sheet and the holder 24 and thereby prevents marking of the glass sheet and/or wear of the holder surface 26.

Figure 4:
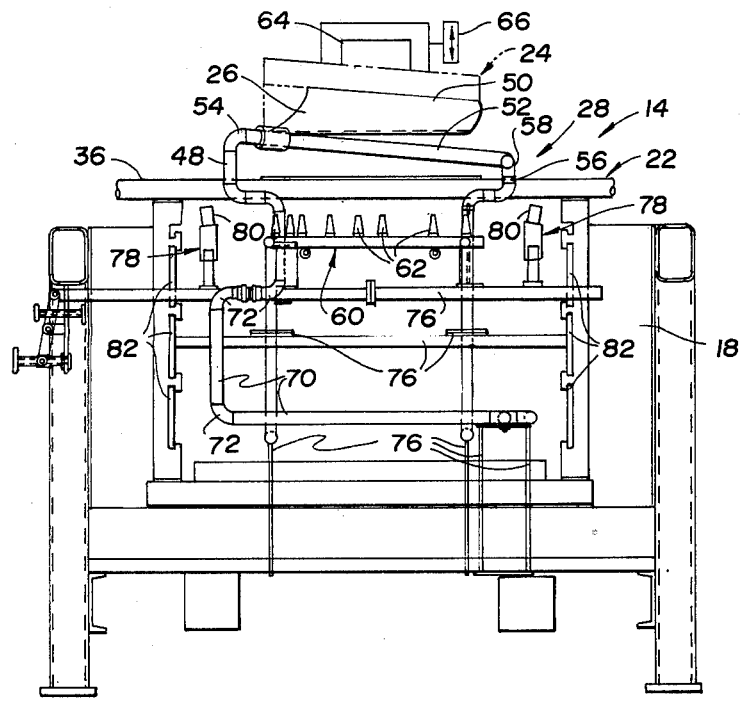
FIG. 4 is an elevation view of the bending station taken along the direction of line 4—4 in FIG. 2.

With reference to FIGS. 2, 3, and 4, the bending unit 28 includes at least one supply conduit 48 that extends upwardly between the conveyor rolls 36 to supply compressed gas to the outlets 34 (FIG. 2) through which the gas is expelled to provide the gas jets. As illustrated, the bending unit 28 includes a pair of the supply conduits 48 respectively located adjacent opposite extremities or ends 50 of the holder surface 26 in order to provide bending of the opposite extremities or ends of a heated glass sheet. Such end bending is conventionally required at opposite ends of glass sheets used for front and back vehicle windows.

With reference to FIG. 2, the bending unit 28 includes a pair of delivery conduits 52 respectively located adjacent the opposite ends 50 of the holder surface 26. Each delivery conduit 52 includes outlets 34 through which the compressed gas is fed to generate the gas jets that provide the glass bending as previously described. As illustrated in FIG. 4, each delivery conduit 52 has a connection 54 to the associated supply conduit 48 in order to be supported thereby and to receive compressed gas therefrom for delivery by the outlets through which the gas jets are expelled. Each delivery conduit 52 is illustrated as having an elongated construction including opposite ends with one end thereof having the connection 54 to the associated supply conduit 48. A pair of supports 56 extend upwardly between the conveyor rolls 36 respectively adjacent the pair of supply conduits 48 at the opposite ends 50 of the holder surface 26. Each delivery tube 52 has another end having a connection 58 to the adjacent support 56 as best seen in FIG. 3. Delivery conduits 52 are thus each supported above the conveyor rolls 36 by the cooperation of the associated supply conduit 48 and support 50 through the connections 54 and 58 to the opposite ends of the delivery conduit.

As best seen in FIG. 2, the holder 24 and compressed gas bending unit 28 of the system illustrated are located within the heating chamber 20 such that no decrease in the glass temperature takes place prior to bending as would be the case with any external location outside of the heating chamber. Roller conveyor 22 thus conveys glass sheets on its spaced rolls 36 within the furnace 12 for heating and to the bending station 14 for the bending without leaving the heating chamber of the furnace. At the bending station, a gas blow-up unit 60 is located below the roller conveyor 22 as shown in FIG. 3 and includes a plurality of gas jet pumps 62 for blowing gas upwardly between the conveyor rolls toward a heated glass sheet upon conveyance below the holder 24. Such upward gas flow provides an upward lifting force to the glass sheet toward the holder surface 26 in the manner taught by U.S. Pat. No. 4,204,854.

With reference to FIG. 3, the holder 24 is disclosed as including a vacuum drawing unit 64 for drawing a vacuum at the holder surface 26 to support a heated glass sheet received from the conveyor in the manner taught by U.S. Pat. Nos. 4,222,763 and 4,282,026. Vacuum drawing unit 64 preferably comprises a gas jet pump that draws gas from a vacuum chamber of the holder 24 in communication through suitable holes with its surface 26 so as to support a heated glass sheet against the holder. The outflow from the gas jet pump of vacuum drawing unit 64 is delivered to the heating chamber. Since substantial flow amplification takes place by the jet pump operation, the primary gas which is supplied to the gas jet pump does not have to be preheated as there is no substantial reduction in the temperature of the heating chamber. Upon completion of the bending by the compressed gas bending unit 28 and movement of the mold 30 on the shuttle 32 under the holder 24, the vacuum drawing unit 64 terminates the vacuum drawn in order to release the heated glass sheet from the surface 26. Preferably, the gas jet pump of the vacuum drawing unit 64 is reversible so as to supply a positive pressure to the holder 24 in order to provide a quick release of the bend glass sheet by blowing it downwardly away from the holder surface 26.

As seen in FIG. 3, the holder 24 also includes an actuator 66 for moving the holder downwardly to a lower position into proximity with the conveyor 22 in order to facilitate the holder in initially receiving and supporting a heated glass sheet from the conveyor by operation of the vacuum drawing unit 64 and/or the blow-up unit 60. Actuator 66 is then operated to move the holder 24 upwardly to a raised position as shown in FIG. 3 in order to allow the mold 30 to be moved on the shuttle 32 under the holder to receive the bent glass sheet. After the holder is moved to its raised position, the compressed gas bending unit 28 is supplied compressed gas such that the gas jets expelled through its outlets 34 shown in FIG. 2 provide the inclined gas jets that are directed as illustrated in FIG. 5 toward the holder surface 26 in a perpendicular relationship to the surface. Such operation of the compressed gas bending unit 28 thus provides the bending of the glass sheet on the holder 24 as the vacuum is also drawn at the holder surface 26 such that the glass sheet conforms to the shape of the holder surface and is supported by the holder until termination of the vacuum as previously described.

With reference to FIG. 5, the outlets 34 of each delivery conduit 52 are disclosed as comprising simple jet openings through which the compressed gas is fed. As the gas jets 35 flow away from the delivery conduit 52, a certain amount of heated gas within the heating chamber is drawn along with th gas jets to provide a greater flow of gas whose combined momentum provides the bending of the glass sheet ends to the shape of the holder surface 26. It is also possible to utilize amplifying type jet pumps as disclosed by U.S. Pat. No. 4,204,854 such that the gas jets 35 draw a greater extent of gas within the heating chamber toward the holder 24 to provide the glass bending. However, the simple jet openings 34 are effective in performance without requiring extensive cost or manufacturing time to produce. It should also be noted that best results are achieved when the gas jets are directed approximately one inch from the edge of the glass at an inclination that defines a twenty-five degree angle to the vertical. Such a construction insures that the glass sheet will be bent to the shape of the holder surface 26 while still allowing sufficient room for the holder 24 to move downwardly to receive the glass sheet and then upwardly to permit the mold 30 to move under the holder. The mold 30 then receives the bent glass sheet for further bending under the operation of gravity as previously described and is moved by the shuttle 32 from below the holder 24 to the quench unit to provide tempering of the bent glass sheet.

As seen in FIG. 2, the compressed gas bending unit includes a supply pipe 68 for feeding compressed gas from below the conveyor to the pair of supply conduits 48 that project upwardly between the conveyor rolls 36 as previously described. As seen in FIG. 4, the supply pipe 68 includes various pipe lengths 70 and elbows 72 that feed the supply conduit 48. A heater 74 shown in FIG. 2 is also provided along the supply pipe 68 and may constitute a coiled length of tubing or merely a suitable length of the supply pipe within the furnace heating chamber 20 in order to provide sufficient heating of the compressed gas so as not to cool the glass sheet during the bending operation.

With combined reference to FIGS. 3 and 4, the compressed gas bending unit 28 and the blow-up unit 60 are supported below the rolls 36 of conveyor 22 by suitable support components 76 that are mounted by the furnace housing 18. Both the compressed gas bending unit 28 and the blow-up unit 60 are mounted in a manner that permits expansion thereof upon heating and contraction thereof upon cooling.

As seen in FIGS. 2, 3, and 4, a pair of burner units 78 are located on opposite lateral sides of the compressed gas bending unit and include burners 80 that are aligned with the spaces between the conveyor rolls 36. During operation of the bending and tempering system 10, combustible gas fed to the burners 80 provides a flame curtain on each side of the holder 24 to prevent quenching gas from the quench unit from infiltrating into the furnace heating chamber through an access opening through which the mold moves. Burner units 78 are also mounted on the furnace housing 18 by suitable support components 76 that permit their expansion and contraction during heating and cooling.

It should be noted that while the furnace illustrated includes electric resistance elements 82 (FIG. 4), it is also possible for the furnace to be heated by gas or any other suitable heater capable of maintaining the furnace at the required temperature.

While the best mode for carrying out the invention has herein been described in detail, those familiar with the art to which this invention relates will recognize various alternative designs and embodiments for practicing the invention as defined by the following claims.

What is claimed is:

1. In a glass sheet bending system including a furnace for heating glass sheets to a sufficiently high temperature for bending, a horizontal conveyor for conveying glass sheets in a generally horizontally extending orientation within the furnace for heating, a holder having a downwardly facing surface of a downwardly convex curved shape for receiving a heated glass sheet from the conveyor, and a mold for receiving the heated glass sheet from the holder, the improvement comprising: a compressed gas bending unit located above the conveyor in proximity to the holder spaced horizontally outward from the periphery of the holder surface; and said bending unit including outlets through which compressed gas is fed to provide inclined gas jets directed toward the holder surface in a generally perpendicular relationship thereto and with a sufficient intensity to bend the heated glass sheet on the holder to the curved shape of its downwardly facing surface.

2. A system as in claim 1 wherein the conveyor is of the roller type including spaced rolls on which the glass sheets are conveyed, and the bending unit including at least one supply conduit extending upwardly between the conveyor rolls to supply compressed gas to the outlets.

3. A system as in claim 2 wherein the bending unit has a delivery conduit which includes the outlets through which the compressed gas is fed, and the delivery conduit having a connection to the supply conduit in order to be supported thereby and to receive compressed gas therefrom for delivery through the outlets.

4. A system as in claim 3 wherein the delivery conduit includes opposite ends, the connection to the supply conduit being at one end of the delivery conduit, and a support that extends upwardly between the conveyor rolls and has a connection to the other end of the delivery conduit.

5. A system as in claim 3 wherein the bending unit includes a pair of the supply conduits and also includes a pair of delivery conduits respectively associated with the pair of supply conduits, each delivery conduit including a plurality of the outlets through which the compressed gas is fed, and a pair of connections that respectively connect the pair of supply conduits and the pair of delivery conduits.

6. A system as in claim 1 wherein the holder and the compressed gas bending unit are located within the heating chamber, the conveyor being of the roller type including spaced rolls on which the glass sheets are conveyed, and a plurality of gas jet pumps for blowing gas upwardly between the rolls of the conveyor toward a heated glass sheet upon conveyance below the holder to provide an upward lifting force toward the holder surface.

7. A system as in claim 1 further including a vacuum drawing unit for drawing a vacuum at the holder surface to support a heated glass sheet received from the conveyor.

8. A system as in claim 1 further including an actuator for moving the holder downwardly into proximity to the conveyor to receive a heated glass sheet from the conveyor and for thereafter moving the holder upwardly to allow the mold to move under the holder to receive the glass sheet.

9. A system as in claim 1 wherein the outlets comprise simple jet openings through which the compressed gas is fed.

10. A system as in claim 1 further including a heater for heating the compressed gas prior to being fed through the outlets.

11. A system as in claim 1, 2, 3, 4, 5, 6, 7, 8, 9, or 10 further including a quench unit to which the mold moves the bent glass sheet to provide tempering.

12. A glass sheet bending and tempering system comprising: a furnace including a heating chamber for heating glass sheets to a sufficiently high temperature for bending and tempering; a horizontal roller conveyor including spaced rolls for conveying glass sheets in a horizontally extending orientation within the furnace for heating; a holder having a surface of a downwardly convex curved shape for receiving a heated glass sheet from the conveyor; a compressed gas bending unit located above the rolls of the conveyor in proximity to the holder spaced horizontally outward from the periphery of the holder surface; said bending unit including outlets through which compressed gas is fed to provide inclined gas jets directed toward the holder surface in a generally perpendicular relationship thereto and with a sufficient intensity to bend the heated glass sheet on the holder to the curved shape of its downwardly facing surface; a curved mold for receiving the bent glass sheet from the holder and having at least a substantial portion with a greater curvature than the holder surface such that the glass sheet bends further on the mold under gravity; and a quench unit to which the mold moves the bent glass sheet to provide tempering.

13. A glass sheet bending and tempering system comprising: a furnace including a heating chamber for heating glass sheets to a sufficiently high temperature for bending and tempering; a horizontal roller conveyor including spaced rolls for conveying glass sheets in a horizontally extending orientation within the furance for heating; a holder having a surface of a downwardly convex curved shape for receiving a heated glass sheet from the conveyor; a vacuum drawing unit for drawing a vacuum at the holder surface to support the heated glass sheet received from the conveyor; an actuator for moving the holder downwardly into proximity to the conveyor to facilitate the glass sheet being received by the holder and for thereafter moving the holder upwardly to a raised position such that the glass sheet is located above the conveyor in a spaced relationship; a compressed gas bending unit located above the rolls of the conveyor in proximity to the holder spaced horizontally outward from the periphery of the holder surface; said bending unit including a pair of supply conduits projecting upwardly between the conveyor rolls adjacent opposite extremities of the holder surface; a pair of delivery conduits respectively connected to the supply conduits; each delivery conduit including outlets through which compressed gas received from the associated supply conduit is fed to provide inclined gas jets directed toward the holder surface in a generally perpendicular relationship thereto and with a sufficient intensity to bend the heated glass sheet on the holder to the curved shape of its downwardly facing surface; a curved mold movable under the holder in its raised position to receive the bent glass sheet from the holder upon termination of the vacuum; said mold having at least a substantial portion with a greater curvature than the holder surface such that the glass sheet bends further on the mold under gravity; and a quench unit to which the mold moves the bent glass sheet to provide tempering.

14. A glass sheet bending and tempering system comprising: a furnace including a heating chamber for heating glass sheets to a sufficiently high temperature for bending and tempering; a horizontal roller conveyor including spaced rolls for conveying glass sheets in a horizontally extending orientation within the furnace for heating; a holder located within the heating chamber and having a surface of a downwardly convex curved shape for receiving a heated glass sheet from the conveyor; a vacuum drawing unit for drawing a vacuum at the holder surface to support the heated glass sheet received from the conveyor; an actuator for moving the holder downwardly into proximity to the conveyor to facilitate the glass sheet being received by the holder and for thereafter moving the holder upwardly to a raised position such that the glass sheet is located above the conveyor in a spaced relationship; a compressed gas bending unit located above the rolls of the conveyor in proximity to the holder spaced horizontally outward from the periphery of the holder surface; said bending unit including a pair of supply conduits projecting upwardly between the conveyor rolls adjacent opposite extremities of the holder surface; a pair of supports projecting upwardly between the conveyor rolls respectively adjacent the pair of supply conduits; the bending unit also including a pair of delivery conduits respectively associated with the pair of supply conduits and the pair of supports associated therewith; each delivery conduit including a first end having a connection to the associated supply conduit and also including a second end having a connection to the associated support; said delivery conduits each including outlets through which compressed gas received from the associated supply conduit is fed to provide inclined gas jets directed toward the holder surface in a generally perpendicular relationship thereto and with a sufficient intensity to bend the heated glass sheet on the holder to the curved shape of its downwardly facing surface; a curved mold movable under the holder in its raised position to receive the bent glass sheet from the holder upon termination of the vacuum; said mold having at least a substantial portion with a greater curvature than the holder surface such that the glass sheet bends further on the mold under gravity; and a quench unit to which the mold moves the bent glass sheet to provide tempering.

15. A glass sheet bending and tempering system comprising: a furnace including a heating chamber for heating glass sheets to a sufficiently high temperature for bending and tempering; a horizontal roller conveyor including spaced rolls for conveying glass sheets in a horizontally extending orientation within the furnace for heating; a holder located within the heating chamber and having a surface of a downwardly convex curved shape; a vacuum drawing unit for drawing a vacuum at the holder surface to support a heated glass sheet received from the conveyor; a plurality of gas jet pumps for blowing gas upwardly between the conveyor rolls to provide an upward lifting force to the heated glass sheet in order to cooperate with the vacuum drawing unit in transferring the heated glass sheet from the conveyor to the holder surface; an actuator for moving the holder downwardly into proximity to the conveyor to facilitate the glass sheet being received by the holder and for thereafter moving the holder upwardly to a raised position such that the glass sheet is located above the conveyor in a spaced relationship; a compressed gas bending unit located above the rolls of the conveyor in proximity to the holder spaced horizontally outward from the periphery of the holder surface; said bending unit including a pair of supply conduits projecting upwardly between the conveyor rolls adjacent opposite extremities of the holder surface; a pair of supports projecting upwardly between the conveyor rolls respectively adjacent the pair of supply conduits; the bending unit also including a pair of delivery conduits respectively associated with the pair of supply conduits and the pair of supports associated therewith; each delivery conduit including a first end having a connection to the associated supply conduit and also including a second end having a connection to the associated support; said delivery conduits each including outlets through which compressed gas received from the associated supply conduit is fed to provide inclined gas jets directed toward the holder surface in a generally perpendicular relationshp thereto and with a sufficient intensity to bend the heated glass sheet on the holder to the curved shaped of its downwardly facing surface; a curved mold movable under the holder in its raised position to receive the bent glass sheet from the holder upon termination of the vacuum; said mold having at least a substantial portion with a greater curvature than the holder surface such that the glass sheet bends further on the mold under gravity; and a quench unit to which the mold moves the bent glass sheet to provide tempering.

* * * * *